United States Patent
Lorenz

(10) Patent No.: US 10,166,978 B2
(45) Date of Patent: Jan. 1, 2019

(54) METHOD FOR AUTOMATICALLY PARKING A VEHICLE AND ASSOCIATED CONTROL DEVICE

(71) Applicant: Audi AG, Ingolstadt (DE)

(72) Inventor: Stephan Lorenz, München (DE)

(73) Assignee: Audi AG, Ingolstadt (DE)

( * ) Notice: Subject to any disclaimer, the term of this patent is extended or adjusted under 35 U.S.C. 154(b) by 232 days.

(21) Appl. No.: 15/116,769

(22) PCT Filed: Dec. 11, 2014

(86) PCT No.: PCT/EP2014/003310
§ 371 (c)(1),
(2) Date: Aug. 4, 2016

(87) PCT Pub. No.: WO2015/117633
PCT Pub. Date: Aug. 13, 2015

(65) Prior Publication Data
US 2018/0194343 A1    Jul. 12, 2018

(30) Foreign Application Priority Data

Feb. 5, 2014 (DE) .......... 10 2014 001 554

(51) Int. Cl.
*B60W 30/06* (2006.01)
*G08G 1/14* (2006.01)
(Continued)

(52) U.S. Cl.
CPC ........... *B60W 30/06* (2013.01); *B60R 16/037* (2013.01); *B60W 40/02* (2013.01); *G05D 1/0282* (2013.01);
(Continued)

(58) Field of Classification Search
USPC .......................................................... 701/23
See application file for complete search history.

(56) References Cited

U.S. PATENT DOCUMENTS 5,669,753 A * 9/1997 Schween .................. E04H 6/22
414/239
2002/0125332 A1 9/2002 Aoki et al.
(Continued)

FOREIGN PATENT DOCUMENTS

CN      102182331 A    9/2011
DE    102008027692    12/2009
(Continued)

OTHER PUBLICATIONS

International Search Report issued by the European Patent Office in International Application PCT/EP2014/003310.
(Continued)

*Primary Examiner* — Tyler D Paige
(74) *Attorney, Agent, or Firm* — Henry M Feiereisen LLC

(57) ABSTRACT

Method for automatically parking a vehicle in a parking area having a multiplicity of parking spaces, comprising the following steps:
allocating a specific parking space for the motor vehicle by means of the control device;
automatic driving, or driving under the control of the control device, of the vehicle to the specific parking space; characterized by the following steps:
making available at least one item of environmental information for the control device;
evaluating the parking spaces on the basis of the at least one item of environmental information; and
if appropriate, re-parking a vehicle located in a parking space which is evaluated as being less than optimum to a parking space which is evaluated as being optimum by the control device.

12 Claims, 2 Drawing Sheets

(51) Int. Cl.
*G05D 1/02* (2006.01)
*G08G 1/16* (2006.01)
*B60R 16/037* (2006.01)
*B60W 40/02* (2006.01)
*G01C 21/34* (2006.01)

(52) U.S. Cl.
CPC ............ *G08G 1/146* (2013.01); *G08G 1/168* (2013.01); *B60W 2550/12* (2013.01); *G01C 21/3461* (2013.01); *G05D 2201/0213* (2013.01)

(56) References Cited

U.S. PATENT DOCUMENTS

| | | | |
|---|---|---|---|
| 2005/0103876 A1 | 5/2005 | Martinez | |
| 2013/0085596 A1* | 4/2013 | Shani | E04H 6/285 700/217 |
| 2013/0231824 A1 | 9/2013 | Wilson et al. | |
| 2015/0039213 A1* | 2/2015 | Stefan | G08G 1/00 701/117 |
| 2015/0187019 A1* | 7/2015 | Fernandes | G06Q 40/08 705/4 |
| 2015/0274106 A1 | 10/2015 | Lorenz et al. | |
| 2016/0155331 A1* | 6/2016 | Mielenz | G08G 1/14 340/932.2 |
| 2017/0021764 A1* | 1/2017 | Adams | B60Q 9/00 |
| 2017/0313305 A1* | 11/2017 | Irion | B60W 30/06 |
| 2018/0012156 A1* | 1/2018 | Voelz | G06Q 10/047 |

FOREIGN PATENT DOCUMENTS

| | | |
|---|---|---|
| DE | 102008027692 A1 | 12/2009 |
| DE | 102009027543 | 1/2011 |
| DE | 102009027543 A1 | 1/2011 |
| EP | 1 775 690 | 4/2007 |
| EP | 1775690 A1 | 4/2007 |
| KR | 1020100013575 | 2/2010 |

OTHER PUBLICATIONS

Chinese Search Report dated Feb. 1, 2018 with respect to counterpart Chinese patent application 2014800701194.
Translation of Chinese Search Report dated Feb. 1, 2018 with respect to counterpart Chinese patent application 2014800701194.

* cited by examiner

METHOD FOR AUTOMATICALLY PARKING A VEHICLE AND ASSOCIATED CONTROL DEVICE

CROSS-REFERENCES TO RELATED APPLICATIONS

This application is the U.S. National Stage of International Application No. PCT/EP2014/003310, filed Dec. 11, 2014, which designated the United States and has been published as International Publication No. WO 2015/117633 and which claims the priority of German Patent Application, Serial No. 10 2014 001 554.8, filed Feb. 5, 2014, pursuant to 35 U.S.C. 119(a)-(d).

BACKGROUND OF THE INVENTION

The invention relates to a method for automatic parking of a vehicle on a parking area having a plurality of parking spaces, including the following steps: assigning a designated parking space for the motor vehicle by the control device, and automatically driving the vehicle or driving the vehicle controlled by the control device to the designated parking space.

Control devices have already been proposed to enable an automatic parking in parking spaces of a parking area or a parking garage. The control device, which serves as a central control point, allocates for each vehicle a designated parking space (parking spot) to which it is then automatically driven driverless. As an alternative, the vehicle can also be driven by the driver to the designated parking space and parked there. To retrieve the vehicle, the user requests the vehicle again, then it is automatically driven to a transfer point.

The document KR 10 2010 013 575 A describes a parking assistance system that uses environmental information such as the sunlight as well as the temperature inside and outside of a vehicle, when selecting a parking space during navigation to this parking space and for automatic control of a ventilation of the vehicle.

US 2013/0231 824 A1 discloses a method for automatic parking of a vehicle, in which the driver is able to leave the vehicle, whereupon an autonomous parking procedure is executed. At a later time instance, the vehicle can be retrieved again at a predetermined location, wherein also a pick-up time can be prespecified.

DE 10 2008 027 692 A1 discloses a method for assisting a driver of a vehicle in a parking operation. After the driver has left the vehicle, the vehicle automatically searches a suitable parking area and parks there. When the driver needs the vehicle again, the vehicle automatically leaves the parking space and drives to a transfer point. The vehicle is hereby provided with environmental sensors, for example ultrasonic sensors, radar sensors, or optical sensors, which can detect the immediate proximity around the vehicle with high precision. For navigation, a vehicle may be equipped with a satellite navigation system.

Although such automatic parking systems are able to realize a considerable increase in comfort for the user because of the absence of sometimes annoying and tedious search for a suitable parking space, situations are conceivable in which a selected parking space proves suboptimal. An example involves a parking space, which is in the shade at the time of parking of the vehicle, and then during the day the vehicle may be exposed to the blazing sun, causing an intense heating of the vehicle interior. When the user retrieves the vehicle at that time, it may be virtually impossible to use the overheated vehicle due to the excessive heat in the interior on hot days. A temperature control by using the air conditioner takes a certain time, in addition much energy is needed.

Situations are also conceivable in which there is risk of damage to the vehicle by severe weather, such as hail. When a vehicle has been assigned an uncovered parking space in this situation, damage is inevitable, when the user fails to retrieve the vehicle in time.

SUMMARY OF THE INVENTION

The invention is therefore based on the object to provide a method for automatic parking of a vehicle, in which the allocation of the parking space is optimized.

This object is attained by providing a method of the afore-mentioned type with the following steps: at least one environmental information is made available for the control device, rating the parking spaces based on the at least one environmental information, with a parking space being considered suboptimal, when the sunlight is so strong as to cause heat-up which exceeds a specified limit value for the vehicle interior temperature, and re-parking the vehicle parked in a parking space rated suboptimal to a parking space rated optimal by the control device.

The method according to the invention differs from conventional methods for automatically parking by parking a vehicle not only on any available parking space, but instead it is checked within the scope of the method whether an assigned parking space is optimal or whether a better parking space is available. For this purpose, the parking spaces are rated on the basis of at least one environmental information. The outcome of this assessment enables a comparison of a currently assigned parking area with other parking areas. When the current parking area is rated to be suboptimal, i.e. worse than another parking area, the control device can re-park the vehicle from the suboptimal parking space to an optimum parking space. The assessment of the allocated parking spaces can take place at specified time intervals, for example every 15 or 30 minutes; it may also be dependent on an environmental information or a change in an environmental information. Examples of such environmental information are high temperatures caused by sunlight or impending damage to vehicles from hail. In both cases, an improvement can be achieved by lowering a vehicle interior temperature or preventing damage by hail to the vehicle. In this way, the comfort for the user in increased.

The new, optimized parking space may initially not have been available at the beginning of parking. The optimized parking space can therefore only be used, when searching again at a later time for a better parking space and to automatically approach the latter. Even when the vehicle at the beginning has been parked optimally, based on the situation at that time, there may be a scenario that this first parking space is later no longer optimal in view of the changed conditions over time, for example because the direction of the sunlight changes during the day.

In the method according to the invention, provision may be made that at least one of the following environmental information is taken into account, when rating the parking spaces: intensity of sunlight, direction of sunlight, incident angle of sunlight, air temperature, hail.

As an alternative or in addition, other environmental factors can be considered such as rain, snow, frost, and the like. The control device may include sensors for detecting the environmental impacts, as an alternative or in addition, this environmental information can be transmitted to the control device via a communication network, for example via the Internet. In this way, the occurrence of certain environmental conditions can be predicted, for example an approaching storm which may involve hail.

According to the invention, a parking space is rated suboptimal, when sunlight is so intense as to cause heat-up sufficient to exceed a predefined limit value for the vehicle interior temperature. The assessment may thus also be based on the difference between the predefined limit value and the actual vehicle interior temperature. The more the current vehicle interior temperature exceeds the limit value, the more suboptimal is the parking space. When a parking space is involved which is rated suboptimal, the control device commands a re-parking to a more optimal parking space, for example to a parking space which is located in the shade.

A particularly efficient improvement of the method according to the invention is attained, when the re-parking is realized with consideration of a known or estimated pick-up time by re-parking the vehicle at a specified time prior to the pick-up time. According to the invention, it is thus possible for the user to provide information about the expected pick-up time, when parking or dropping off the vehicle. It is also possible that the user provides the information about the pick-up time later or changes it, for example via a mobile phone or via the Internet. Thus, the user may, e.g., provide information about the desire to pick-up the vehicle in 30 minutes. In this case, the control device can re-park the vehicle at a specified time prior to the pick-up time, for example 15 or 30 minutes beforehand, so as to be able to cool down the vehicle during the remaining time period until pick-up.

It is also possible to implement the re-parking by taking into account a known or estimated pick-up time, with a ventilation device being turned on in the vehicle at a specified time prior to the pick-up time and, optionally, after optimization of the parking situation through re-parking the vehicle to another parking space. In order to realize the desired cooling of the vehicle interior, provision may also be made for opening one or more windows of the motor vehicle, while the ventilation device is switched on, so that the vehicle interior is cooled by cooler outside air. As an alternative or in addition to the ventilation device, an air conditioning system may, optionally, also be turned on.

To avoid damage to a vehicle, provision may be made in a method according to the invention to re-park a vehicle parked in an unprotected parking space to a covered parking space, when hail is predicted or encountered. This approach is particularly appropriate in parking garages, which uses also an uncovered upper level. In the event of imminent hail, the vehicles can be maneuvered by the control device in time to covered, protected parking spaces so that damage can be reliably avoided.

Since the method according to the invention results in an increase in comfort for the user, a fee may be charged for a re-parking to an optimum parking space.

In addition, the invention relates to a control device which is suitable for executing the described method.

BRIEF DESCRIPTION OF THE DRAWING

Exemplary embodiments of the invention will become apparent hereinafter with reference to the drawings. The drawings are schematic representations and show.

DETAILED DESCRIPTION OF PREFERRED EMBODIMENTS

Figure 1:
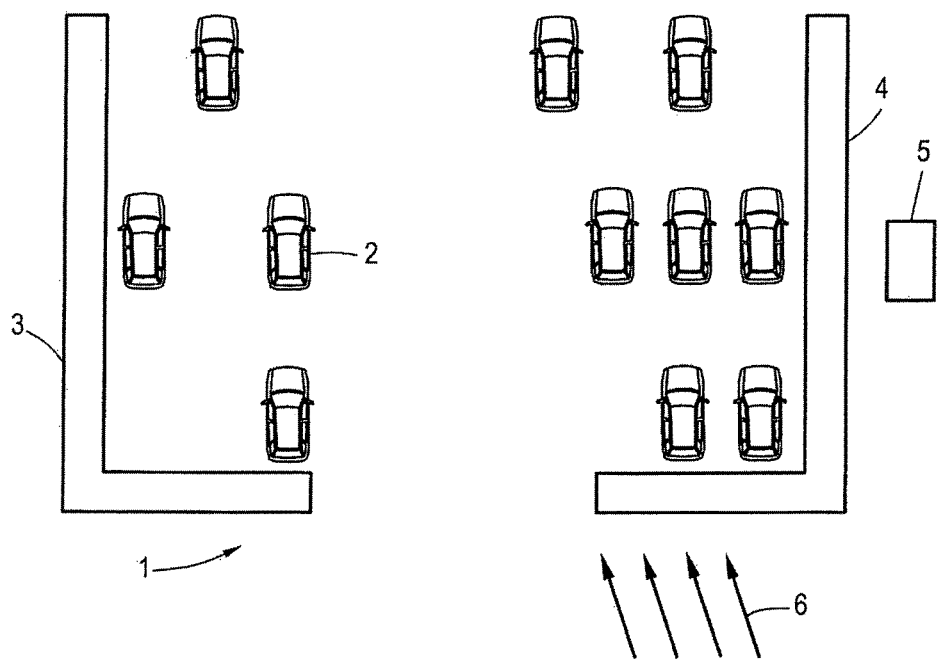
FIG. 1 a parking area, on which the method according to the invention is executed.

FIG. 1 is a schematic plan view and shows a parking area 1 with a plurality of parking spaces that are partially occupied by vehicles 2. It is apparent from the plan view of FIG. 1 that the parking area 1 is bounded on several sides by walls or brickworks 3, 4 shown schematically. A control device 5 is provided to assign a certain parking space to a vehicle 2. A user moves his vehicle to a drop-off location from which the control device 5 takes over the vehicle. A certain parking space is assigned to the vehicle, and the control device steers the vehicle 2 to the specified parking space, where it is parked. When dropping off the vehicle, the user can indicate the pick-up time.

The parking area 1 shown in FIG. 1 is outdoors. An arrow 6 indicates the direction of incident sunlight. The direction of the arrow 6, as shown in FIG. 1, corresponds to the situation in the morning. At this time instance, some vehicles are in the shadow of the wall 4. The direction of sunlight is taken into account by the control device 5 as environmental information. In addition, further environmental information is considered, such as air temperature and a possibly predicted storm, which may, e.g., involve hail.

Figure 2:
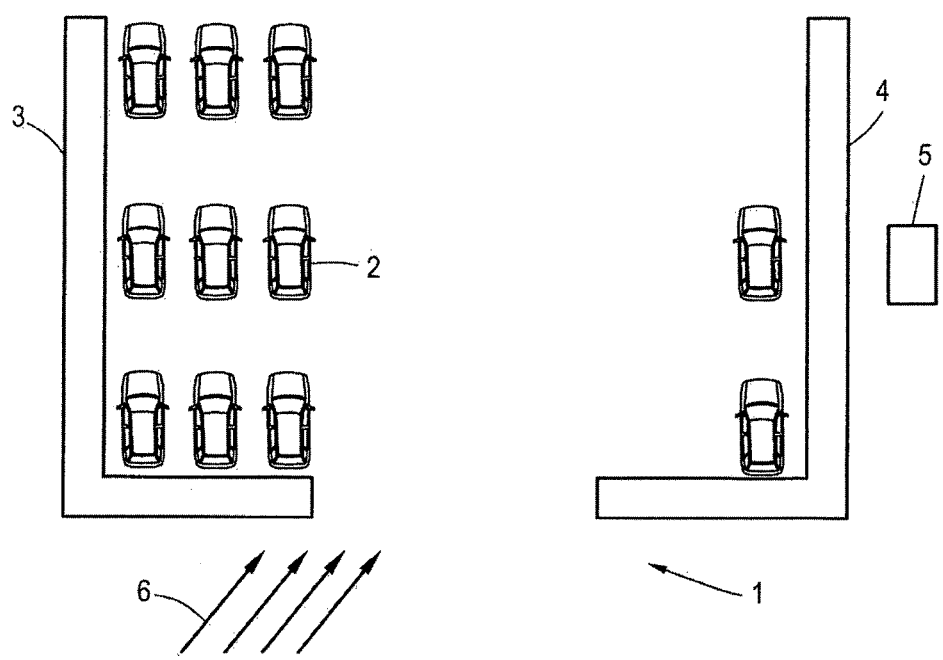
FIG. 2 the parking area shown in FIG. 1 at a later point in time compared to FIG. 1.

The individual parking spaces are assessed on the basis of the environmental information, i.e. by considering the direction of sunlight. Those parking spaces, which are in the shade due to the wall 4, are rated as optimal, those parking spaces, which are in the sun, are rated as suboptimal. Assigned to the individual parking spaces may also be a numerical value as a function of incident sunlight. This assessment carried out by the control device 5 is repeated at regular intervals, in the illustrated exemplary embodiment after every 30 minutes. During the day, the direction of sunlight changes, as illustrated in FIG. 2. At this time, the sunlight is incident from the direction indicated by arrow 6. Accordingly, vehicles located next to the wall 4 would be completely exposed to sunlight. Since the sunlight causes intense heating of the vehicle interior, which is undesirable, vehicles at a parking space that had been rated suboptimal and therefore disadvantageous are steered and re-parked by the control device 5. FIG. 2 shows that most of the vehicles have been parked so as to be in the shadow of the wall 3.

Normally, however, the number of "optimal" parking spaces that are situated in the shade is limited so that not all vehicles can be parked in the shade. The control device 5 thus controls re-parking as a function of the expected pick-up time, so that vehicles are re-parked at a specified point in time prior to the pick-up time, from this time 30 minutes beforehand, to a parking space that is in the shade. In addition, the windows of the vehicle are then opened so that the interior can be cooled by cool air, the cooling process is further assisted by turning on the ventilation device of the respective vehicle.

Figure 3:
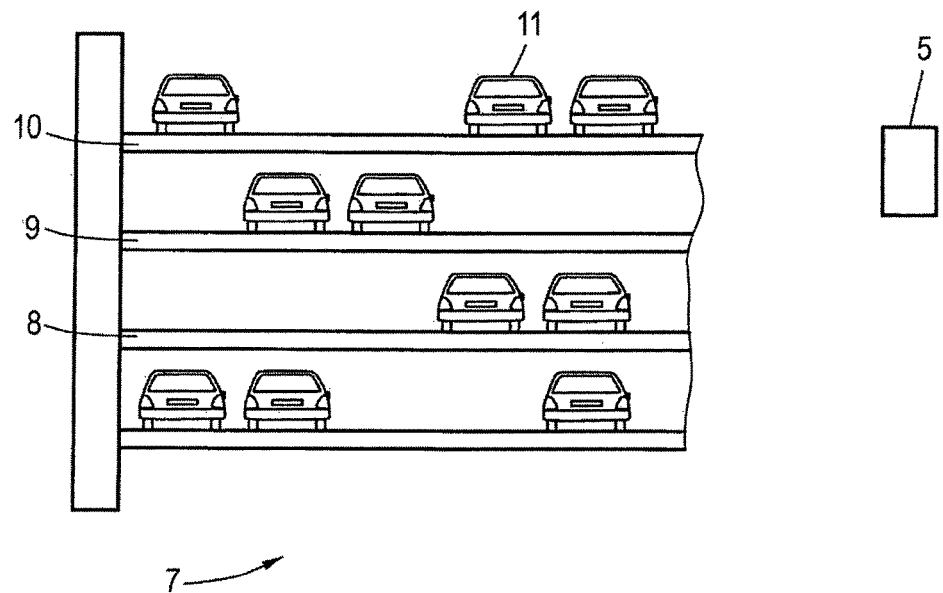
FIG. 3 a parking garage, in which the method according to the invention is executed.
Figure 4:
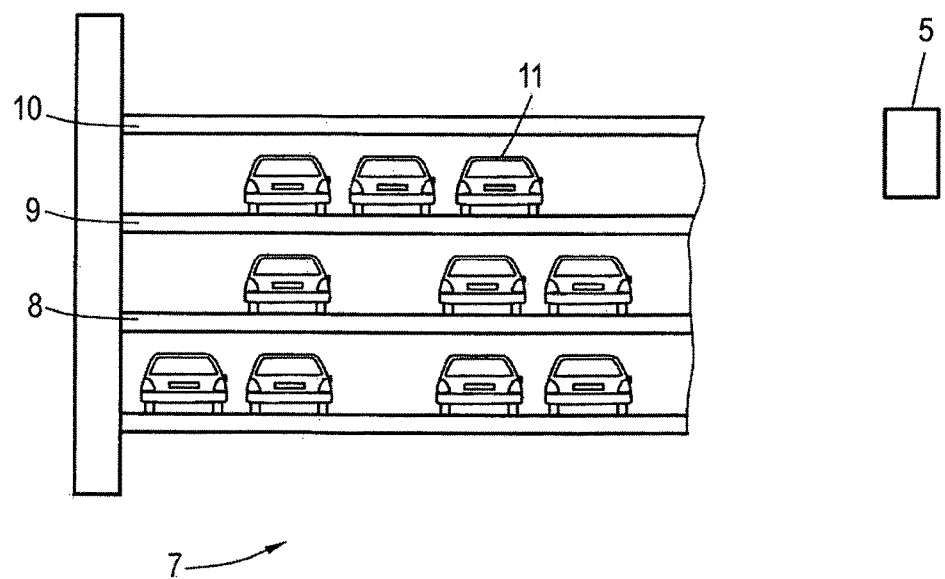
FIG. 4 the parking garage shown in FIG. 3 at a later point in time compared to FIG. 3.

FIGS. 3 and 4 show a second exemplary embodiment of the method according to the invention. FIG. 3 shows a parking garage 7 with several levels 8, 9, 10, with the upper level 10 being in the open air. The control device 5 receives environmental information via an Internet connection. In the event, a storm is predicted with hail, the parking spaces on the upper level 10 are rated as suboptimal, because hail could cause damage to the vehicles 11. In this situation, the control device 5 causes the vehicles 11, parked on the uppermost level 10, to be re-parked at another level.

FIG. 4 shows the parking garage 7 after the implemented maneuver. The vehicles 11 of the uppermost level 10 have been re-parked by the control device 5 to vacant parking spaces of the levels 8, 9 and further lower levels, which have been rated as optimal in comparison to a parking space on the uppermost level 10. By re-parking the vehicles 11 from an unprotected parking space to a covered parking space, damage by hail can be avoided.

What is claimed is:

1. A method for automatically parking a vehicle on a parking area having a plurality of parking spaces, said method comprising:
    assigning a designated parking space for the vehicle by a control device, which serves as a central control point, includes sensors for detecting environmental impacts and receives environmental information via an Internet connection;
    automatically driving or controlling by the control device driving of the vehicle to the designated parking space;
    providing at least one environmental information for the control device;
    rating the parking spaces repeatedly at specified time intervals on the basis of the at least one environmental information, with a parking space being rated suboptimal, when sunlight is intense enough to cause heat-up which exceeds a specified limit value for a vehicle interior temperature; and
    re-parking by the control device a vehicle located in a parking space rated as suboptimal to a parking space rated as optimal.

2. The method of claim 1, wherein the at least one environmental information is selected from the group consisting of intensity of sunlight, direction of sunlight incident angle of sunlight, air temperature, and hail.

3. The method of claim 1, wherein the vehicle is re-parked as a function of a known or estimated pick-up time, with the vehicle being re-parked at a specified point in time prior to the pick-up time.

4. The method of claim 1, wherein the vehicle is re-parked as a function of a known or estimated pick-up time, and further comprising turning on a ventilation device of the vehicle at a specified time prior to the pick-up time.

5. The method of claim 1, wherein a vehicle parked on an unprotected parking space is re-parked in a covered parking space, when hail is predicted or encountered.

6. The method of claim 1, further comprising charging a fee, when the vehicle is re-parked in the optimal parking space.

7. A control device, configured for executing the method of claim 1.

8. A control device for automatically parking a vehicle on a parking area having a plurality of parking spaces, said control device serving as a central control point, including sensors for detecting environmental impacts, receiving environmental information via an Internet connection, and being constructed to: assign a designated parking space for the vehicle;
    move the vehicle to the designated parking space;
    rate the parking spaces repeatedly at specified time intervals on the basis of at least one environmental information, with a parking space being rated suboptimal, when sunlight is intense enough to cause heat-up which exceeds a specified limit value for a vehicle interior temperature, and
    re-park a vehicle located in a parking space rated as suboptimal to a parking space rated as optimal.

9. The control device of claim 8, wherein the at least one environmental information is selected from the group consisting of intensity of sunlight, direction of sunlight incident angle of sunlight, air temperature, and hail.

10. The control device of claim 8, constructed to re-park the vehicle as a function of a known or estimated pick-up time, with the vehicle being re-parked at a specified point in time prior to the pick-up time.

11. The control device of claim 8, constructed to re-park the vehicle as a function of a known or estimated pick-up time, and to turn on a ventilation device of the vehicle at a specified time prior to the pick-up time.

12. The control device of claim 8, constructed to re-park a vehicle, parked on an unprotected parking space, in a covered parking space, when hail is predicted or encountered.

* * * * *